E. SALZER.
CIGAR CUTTER.
APPLICATION FILED MAY 2, 1908.
902,171.
Patented Oct. 27, 1908.
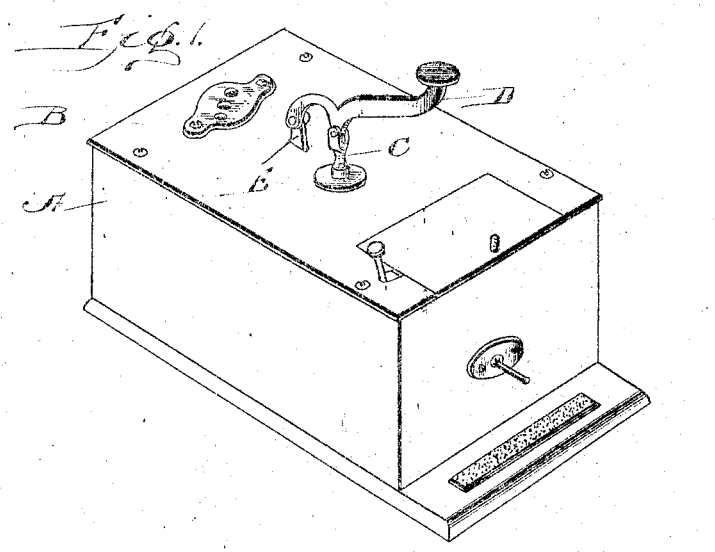
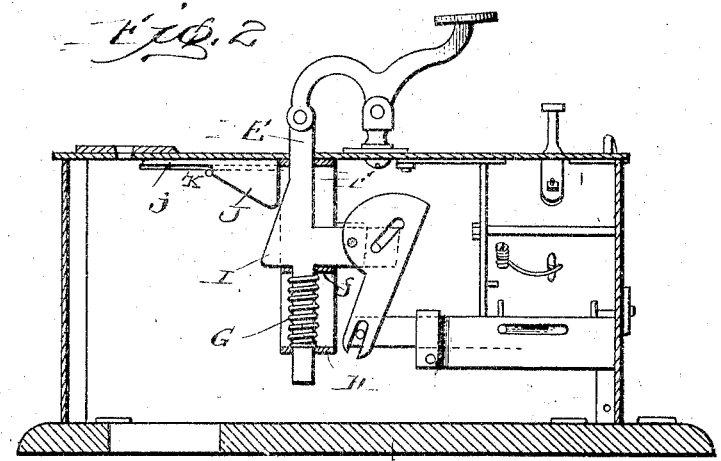
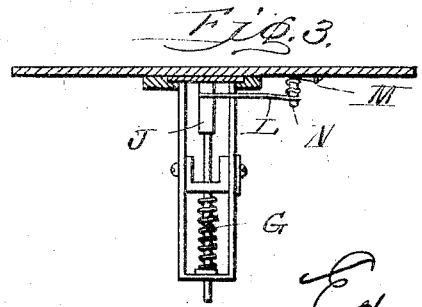
Witnesses
L. E. Barkley
L. A. Sands
Inventor:
Edward Salzer
By Frank S. Appleman,
Attorney

UNITED STATES PATENT OFFICE.

EDUARD SALZER, OF LAPORTE, INDIANA.

CIGAR-CUTTER.

No. 902,171.  Specification of Letters Patent.  Patented Oct. 27, 1908.

Application filed May 2, 1908. Serial No. 430,572.

*To all whom it may concern:*

Be it known that I, EDUARD SALZER, a citizen of the United States of America, residing at Laporte, county of Laporte, and State of Indiana, have invented certain new and useful Improvements in Cigar-Cutters, of which the following is a specification.

This invention relates to devices for clipping the ends of cigars, this invention being divided out of my original application for patent for improvements in cigar cutters, filed November 26, 1906, Serial No. 345,261.

An object of this invention is to produce a cigar cutter having a casing with a series of graduated openings into which the cigar may be inserted a greater or less extent in order that the size of the cut may be made to suit the user; a knife being provided which is made to reciprocate with relation to the casing through suitable novel mechanism to be hereinafter described.

A further object of this invention is to provide a cigar cutter which will possess advantages in points of simplicity, efficiency and durability, proving at the same time comparatively inexpensive to manufacture.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1, is a perspective view of a casing with parts of the operating mechanism exposed; Fig. 2, is a vertical longitudinal sectional view taken approximately central of the casing with the operating parts elevated; and Fig. 3, is a detail view of the operating lever with the knife in section.

In the drawings A, denotes the casing having a suitable top B, containing a bifurcated post C, in which an operating lever D, is pivoted, the said lever having a goose neck to which the upper end of the operating rod E, is pivoted. The rod is slidable in a suitable guide F, and the said guide is provided with a web $f$, against which the spring G, bears; the lower end of said spring being in engagement with a plate H, attached to the bar E. Through the medium of the spring G, the bar is held normally depressed and the pressure of the spring is overcome only by pressure on the outer end of the lever D, which action results in elevating the bars.

The bar is provided with a cam I, which rides over a fin J, attached to or formed with the knife $j$, the said knife being slidable in contact with the under surface of the top of the casing in such relation to the apertures of the casing as to permit the cutting edge of the knife to pass over the said openings in order that any cigar inserted in the opening will have its ends severed.

The knife is mounted to slide between suitable guides K, riveted or otherwise secured to the inner surface of the top of the casing and the said knife is held normally retracted through the medium of the spring L, which has one end in engagement with the fin of the knife and the other in engagement with the stud M, projecting from the top, the said spring being coiled approximately centrally around the stud N, which also depends from the inner surface of the top.

In operating the cigar cutter, reciprocation of the bar carrying the cam results in the cam riding over the end of the fin and projecting the said fin and blade toward the openings in the casing, and as the bar is depressed through the agency of the spring G, the action of the cam is removed from the fin to retract the knife and hold the inner end of the fin in engagement with the cam until the operation is repeated.

The match delivery mechanism being shown in connection with the cigar cutter forming the subject matter of my original application above referred to, will not be described in detail.

I claim—

1. A device of the character described comprising a reciprocating knife, a casing having apertures with relation to which the knife reciprocates, a fin on the knife, a spring engaging the knife for holding the knife normally retracted, a reciprocating bar, a cam on the bar engaging the fin of the knife whereby the knife is projected, and means for reciprocating the bar.

2. A device of the character described consisting of an apertured casing, a knife mounted to reciprocate with relation to the aperture, a fin on the knife, a spring engaging the fin for holding the knife retracted, a guide, a bar slidable therein, a spring for holding the bar normally depressed, a cam on the bar adapted to engage the fin of the knife and projecting the same when the knife is moving upward, a spring for depressing the bar, and a suitable lever for operating the bar.

3. In combination, a suitable knife, a fin thereon, a spring engaging the outer end of the fin for holding the knife normally retracted, a bar slidable with relation to the end of the fin, a cam on the bar adapted to engage the fin and project the knife when the said bar is moving upwardly, a spring for depressing the bar, and a lever for reciprocating the bar.

4. A device of the character described comprising a resiliently mounted cutter having a pendent fin or extension, a resiliently upheld member having an inclined cam formation adapted to engage said fin or extension and means for actuating said resiliently upheld member.

5. A device of the character described comprising a member having apertures therein adapted to receive the tip end of a cigar, a resiliently mounted cutter having a pendent extension or fin, said cutter adapted as it is actuated to move past said apertures for engaging the inserted cigar tip ends, a resiliently upheld member having a cam formation whose face is inclined upwardly and inwardly for engagement initially at its upper vanishing end with the lower end of said fin or extension, and means for actuating said resiliently upheld member.

6. A device of the character described, comprising a member having apertures therein for the reception of the tip end of a cigar, a resiliently mounted cutter adapted for severing said end of a cigar when inserted through any one of said apertures, a guide supported from the underside of the first referred to member, a resiliently upheld member, arranged in said guide, and manually actuated means for operating said resiliently upheld member, said latter member having an incline-faced cam formation for engagement with said fin or extension.

7. A cigar cutter embracing a member having an aperture adapted to receive the tip-end of a cigar, a resiliently seated cutter of plate-like outline slidably arranged to intercept a vertical line passing through said aperture and having depending from its underside about centrally a fin or extension, a resiliently upheld cam-member, means for guiding the movement of said cam-member, and means for actuating said cam member, said cam member arranged to move in a line at a right angle to the movement of said cutter and having an inclined cam formation arranged edgewise to, and adapted to similarly engage said cutter.

In testimony whereof, I affix my signature in the presence of two witnesses.

EDUARD SALZER.

Witnesses:
W. H. BECHER,
GRACE PAYNE.